US012742570B2

(12) United States Patent
Boehmer et al.

(10) Patent No.: US 12,742,570 B2
(45) Date of Patent: Sep. 22, 2026

(54) HEATER BUNDLES HAVING VARIABLE POWER OUTPUT WITHIN ZONES

(71) Applicant: Watlow Electric Manufacturing Company, St. Louis, MO (US)

(72) Inventors: Scott Boehmer, Hannibal, MO (US); Mark Everly, St. Charles, MO (US)

(73) Assignee: Watlao Electric Manufacturing Company, St. Louis, MO (US)

(*) Notice: Subject to any disclaimer, the term of this patent is extended or adjusted under 35 U.S.C. 154(b) by 1175 days.

(21) Appl. No.: 17/197,525

(22) Filed: Mar. 10, 2021

(65) Prior Publication Data

US 2021/0190378 A1 Jun. 24, 2021

Related U.S. Application Data

(63) Continuation-in-part of application No. 16/272,668, filed on Feb. 11, 2019, now Pat. No. 11,781,784,
(Continued)

(51) Int. Cl.
*F24H 15/37* (2022.01)
*F24H 1/10* (2022.01)
(Continued)

(52) U.S. Cl.
CPC ............ *F24H 15/37* (2022.01); *F24H 1/103* (2013.01); *F24H 9/2028* (2013.01); *F24H 15/25* (2022.01);
(Continued)

(58) Field of Classification Search
None
See application file for complete search history.

(56) References Cited

U.S. PATENT DOCUMENTS 686,288 A * 11/1901 Griffing .................. F22B 1/287 392/399
710,429 A * 10/1902 Collins et al. ....... A61N 1/0492 307/132 R
(Continued)

FOREIGN PATENT DOCUMENTS

CN 101142852 3/2008
CN 103826482 5/2014
(Continued)

OTHER PUBLICATIONS

Extended and Partial European Search Report issued in corresponding EP Application No. 22161468.8, issued Nov. 7, 2022, 11 pages.
(Continued)

*Primary Examiner* — Thor S Campbell
(74) *Attorney, Agent, or Firm* — Burris Law, PLLC

(57) ABSTRACT

A heater system includes a heater bundle with heater assemblies, at least one of the heater assemblies having a plurality of heater units, at least one heater unit having an independently controlled heating zone, and the at least one heater assembly having a physical construction configured to deliver a variable power output per unit length along a length of the at least one heater assembly. A plurality of power conductors are electrically connected to the plurality of heater units and the heater system further includes a means for determining temperature. A power supply device includes a controller configured to modulate power to the independently controlled heating zone through the power conductors based on the determined temperature to provide a desired power output along a length of the at least one heater assembly.

22 Claims, 11 Drawing Sheets

Related U.S. Application Data which is a continuation of application No. 15/058,838, filed on Mar. 2, 2016, now Pat. No. 10,247,445.

(51) Int. Cl.

| | |
|---|---|
| ***F24H 9/20*** | (2022.01) |
| ***F24H 15/25*** | (2022.01) |
| ***H05B 1/02*** | (2006.01) |
| ***H05B 3/04*** | (2006.01) |
| ***H05B 3/48*** | (2006.01) |
| ***H05B 3/82*** | (2006.01) |
| *F24H 15/128* | (2022.01) |

(52) U.S. Cl.

CPC ............. *H05B 1/0283* (2013.01); *H05B 3/04* (2013.01); *H05B 3/48* (2013.01); *H05B 3/82* (2013.01); *F24H 15/128* (2022.01); *H05B 2203/014* (2013.01)

(56) References Cited

U.S. PATENT DOCUMENTS

| | | | | | | |
|---|---|---|---|---|---|---|
| 1,258,767 | A | * | 3/1918 | Hadaway, Jr. | H05B 3/80 | 392/501 |
| 1,320,890 | A | * | 11/1919 | Moffat | H01C 1/14 | 219/486 |
| 1,445,501 | A | * | 2/1923 | Dwinall | H05B 3/78 | 392/443 |
| 1,451,863 | A | * | 4/1923 | Clark | F24H 1/202 | 219/486 |
| 1,525,176 | A | * | 2/1925 | Givens | E21B 36/04 | 392/301 |
| 1,674,369 | A | * | 6/1928 | Mcquinn | F24H 1/202 | 392/452 |
| 1,680,104 | A | * | 8/1928 | Head | H05B 3/46 | 392/338 |
| 1,759,281 | A | * | 5/1930 | Rosenberger | F24H 1/102 | 392/500 |
| 1,787,450 | A | * | 1/1931 | Lonergan | F24H 9/2021 | 219/512 |
| 1,849,175 | A | * | 3/1932 | Clark | F24H 1/225 | 219/508 |
| 2,104,848 | A | * | 1/1938 | Clark | H01H 37/60 | 337/392 |
| 2,213,464 | A | * | 9/1940 | Fogwell | F24H 9/1818 | 392/500 |
| 2,375,871 | A | * | 5/1945 | Reifenberg | F24H 1/202 | 126/362.1 |
| 2,437,262 | A | * | 3/1948 | Levitt | F24H 9/2021 | 219/486 |
| 2,498,054 | A | * | 2/1950 | Taylor | H05B 1/0277 | 219/486 |
| 2,846,536 | A | * | 8/1958 | Drugmand | H05B 3/16 | 338/261 |
| 3,340,382 | A | * | 9/1967 | Lennox | H05B 3/82 | 219/544 |
| 3,621,566 | A | * | 11/1971 | Welsh | H05B 3/40 | 427/398.1 |
| 3,873,807 | A | * | 3/1975 | Mohr | F24H 1/225 | 392/338 |
| 4,039,995 | A | | 8/1977 | Walton et al. | | |
| 4,090,062 | A | * | 5/1978 | Phillips | H02J 3/14 | 219/486 |
| 4,132,262 | A | * | 1/1979 | Wibell | F25D 17/02 | 165/206 |
| 4,272,673 | A | * | 6/1981 | Semanaz | H05B 3/16 | 338/264 |
| 4,908,498 | A | * | 3/1990 | Kivela | G05D 23/1917 | 219/486 |
| 5,023,430 | A | * | 6/1991 | Brekkestran | A41D 13/0051 | 219/486 |
| 5,105,067 | A | * | 4/1992 | Brekkestran | G05D 23/1934 | 219/486 |
| 5,197,375 | A | * | 3/1993 | Rosenbrock | G05D 23/22 | 99/335 |
| 5,280,422 | A | | 1/1994 | Moe et al. | | |
| 5,586,214 | A | * | 12/1996 | Eckman | H05B 3/48 | 219/544 |
| 5,774,627 | A | * | 6/1998 | Jackson | H05B 3/48 | 392/503 |
| 5,824,993 | A | * | 10/1998 | Chrysochoos | H05B 3/84 | 219/547 |
| 5,831,250 | A | * | 11/1998 | Bradenbaugh | H05B 1/0283 | 219/494 |
| 5,844,211 | A | * | 12/1998 | Henry | H05B 3/82 | 219/386 |
| 5,930,459 | A | * | 7/1999 | Eckman | H05B 3/82 | 219/544 |
| 6,080,973 | A | * | 6/2000 | Thweatt, Jr. | F24H 15/37 | 219/505 |
| 6,337,470 | B1 | * | 1/2002 | Von Arx | H05B 3/48 | 219/544 |
| 6,363,216 | B1 | * | 3/2002 | Bradenbaugh | F24H 1/202 | 219/441 |
| 6,374,046 | B1 | * | 4/2002 | Bradenbaugh | F24H 15/407 | 219/492 |
| 6,566,633 | B2 | * | 5/2003 | Kitada | G05D 23/1934 | 219/486 |
| 6,611,660 | B1 | * | 8/2003 | Sagal | H05B 3/48 | 392/503 |
| 6,621,985 | B1 | * | 9/2003 | Thweatt, Jr. | F24H 9/2014 | 392/485 |
| 6,643,454 | B1 | * | 11/2003 | Rochelle | F24H 1/54 | 392/485 |
| 6,946,626 | B2 | * | 9/2005 | Hirayama | G05B 15/02 | 219/492 |
| 7,050,706 | B2 | * | 5/2006 | Israelsohn | F24H 9/2028 | 392/314 |
| 7,257,464 | B2 | * | 8/2007 | Fennewald | H05B 1/02 | 700/297 |
| 7,918,109 | B2 | * | 4/2011 | Pinkowski | D06F 39/40 | 392/397 |
| 8,219,258 | B1 | * | 7/2012 | Almeida | G05B 15/02 | 700/297 |
| 9,065,294 | B2 | * | 6/2015 | Kambara | H02J 13/00004 | |
| 10,477,897 | B2 | * | 11/2019 | Schlipf | H05B 3/46 | |
| 2002/0011480 | A1 | * | 1/2002 | Schilling | H05B 3/746 | 219/448.11 |
| 2002/0015585 | A1 | * | 2/2002 | Jensen | H05B 3/82 | 392/501 |
| 2002/0040898 | A1 | * | 4/2002 | Von Arx | B29C 65/3448 | 219/535 |
| 2004/0039487 | A1 | | 2/2004 | Fennewald et al. | | |
| 2005/0067405 | A1 | * | 3/2005 | DeAngelis | H05B 3/34 | 219/549 |
| 2008/0083741 | A1 | | 4/2008 | Giddings et al. | | |
| 2010/0326964 | A1 | | 12/2010 | Gubler et al. | | |
| 2013/0163970 | A1 | * | 6/2013 | Schwarzkopf | F16L 53/38 | 392/478 |
| 2014/0321841 | A1 | * | 10/2014 | Etscheid | H01C 17/02 | 219/478 |
| 2015/0289320 | A1 | * | 10/2015 | Long | H05B 3/42 | 219/541 |
| 2015/0369414 | A1 | * | 12/2015 | Schwarzkopf | H05B 3/06 | 242/430 |
| 2016/0295641 | A1 | | 10/2016 | Boehmer et al. | | |
| 2017/0254564 | A1 | | 9/2017 | Everly et al. | | |
| 2017/0254565 | A1 | * | 9/2017 | Everly | H05B 3/82 | |

FOREIGN PATENT DOCUMENTS

| | | | |
|---|---|---|---|
| CN | 104025702 | | 9/2014 |
| DE | 202010003291 | U1 | 8/2010 |
| EP | 3737206 | | 11/2020 |
| JP | S5311328 | A | 2/1978 |
| JP | S61120191 | U | 7/1986 |
| JP | S61239590 | A | 10/1986 |
| JP | S62256396 | A | 11/1987 |
| JP | H05173652 | A | 7/1993 |

(56) References Cited

FOREIGN PATENT DOCUMENTS

| | | | |
|---|---|---|---|
| JP | H0592991 | U | 12/1993 |
| JP | H08328415 | A | 12/1996 |
| JP | 2008071728 | A | 3/2008 |
| JP | 2016054059 | A | 4/2016 |
| JP | 2019511090 | A | 4/2019 |
| KR | 2020140004692 | | 8/2014 |
| WO | 2004019143 | | 3/2004 |
| WO | 2013033402 | | 3/2013 |
| WO | 2013034458 | | 3/2013 |
| WO | 2018009768 | A1 | 1/2018 |

OTHER PUBLICATIONS

Office Action issued in corresponding MX Application No. MX/a/2022/002933, issued Aug. 13, 2025, 7 pages.
Office Action issued in corresponding JP Application No. 2022-037250, issued Dec. 2, 2025 and an English translation, 11 pages.
Office Action issued in corresponding JP Application No. 2022-037250, issued May 26, 2026, and an English translation, 5 pages.

* cited by examiner

HEATER BUNDLES HAVING VARIABLE POWER OUTPUT WITHIN ZONES

CROSS-REFERENCE TO RELATED APPLICATIONS

The present application is a continuation-in-part application of U.S. Ser. No. 16/272,668, filed Feb. 11, 2019, and titled "Heater Bundle for Adaptive Control," which is a continuation application of U.S. Ser. No. 15/058,838, now U.S. Pat. No. 10,247,445, filed Mar. 2, 2016. The contents of the above disclosures are incorporated herein by reference in their entirety.

FIELD

The present disclosure relates to electric heaters, and more particularly to heaters for heating a fluid flow such as heat exchangers.

BACKGROUND

The statements in this section merely provide background information related to the present disclosure and may not constitute prior art.

A fluid heater may be in the form of a cartridge heater, which has a rod configuration to heat fluid that flows along or past an exterior surface of the cartridge heater. The cartridge heater may be disposed inside a heat exchanger for heating the fluid flowing through the heat exchanger. If the cartridge heater is not properly sealed, moisture and fluid may enter the cartridge heater to contaminate the insulation material that electrically insulates a resistive heating element from the metal sheath of the cartridge heater, resulting in dielectric breakdown and consequently heater failure. The moisture can also cause short circuiting between power conductors and the outer metal sheath. The failure of the cartridge heater may cause costly downtime of the apparatus that uses the cartridge heater.

SUMMARY

The present disclosure provides a heater system comprising a heater bundle, the heater bundle comprising a plurality of heater assemblies, at least one of the heater assemblies comprising a plurality of heater units, at least one heater unit having an independently controlled heating zone, and the at least one heater assembly comprising a physical construction configured to deliver a variable power output per unit length along a length of the at least one heater assembly. A plurality of power conductors are electrically connected to the plurality of heater units, and the heater system further comprises a means for determining temperature. A power supply device includes a controller configured to modulate power to the independently controlled heating zone through the power conductors based on the determined temperature to provide a desired power output along a length of the at least one heater assembly.

In variations of this heater system, which may be implemented individually or in any combination: the physical construction comprises a resistive heating element within at least one heater unit having a variable pitch; the variable pitch is continuously variable along a length of the resistive heating element; the physical construction comprises a resistive heating element within at least one heater unit having a variable cross-sectional area; the physical construction comprises a resistive heating element within at least one heater unit having a variable cross-sectional area and a variable pitch; the physical construction comprises a plurality of parallel circuits within at least one heater unit; the physical construction is provided in more than one of the plurality of heater units; the physical construction comprises a composite heating element having a higher electrical resistivity proximate an adjacent heater unit or an end portion of the at least one heater assembly and a lower electrical resistivity proximate another opposed adjacent heater unit; the physical construction is provided in more than one of the heater assemblies; at least one heater assembly from among the plurality of the heater assemblies is a cartridge heater; the physical construction comprises at least one heater unit having a cross-sectional area that is different from adjacent heater units; the heater units include a plurality of resistive heating elements, wherein at least one of the resistive heating elements functions as a sensor; the physical construction comprises a composite heating element having a variable electrical resistivity; the variable electrical resistivity comprises a higher electrical resistivity proximate an adjacent heater unit or an end portion of the at least one heater assembly and a lower electrical resistivity proximate an opposed adjacent heater unit.

In another form, an apparatus for heating fluid comprises the aforementioned heater system along with a sealed housing defining an internal chamber and having a fluid inlet and a fluid outlet, the heater bundle being disposed within the internal chamber of the housing. The heater bundle is adapted to provide a responsive heat distribution to a fluid within the housing.

In still another form, a heater system includes a heater bundle comprising a plurality of heater assemblies, at least one of the heater assemblies comprising a plurality of heater units, at least one heater unit having an independently controlled heating zone, and the at least one heater assembly comprising a physical construction configured to deliver a variable power output per unit length along a length of the at least one heater assembly. A plurality of power conductors are electrically connected to the heater units, and a means for determining at least one of heating conditions and heating requirements is provided. A power supply device includes a controller configured to modulate power to the independently controlled heating zone through the power conductors based on the at least one of heating conditions and heating requirements to provide a desired power output along a length of the at least one heater assembly.

In a variation of this heater system, at least one of heating conditions and heating requirements are selected from the group consisting of life of the heater units, reliability of the heater units, sizes of the heater units, costs of the heater units, heater flux, characteristics and operation of the heater units, power output, power input, and total heat generated.

In a further variation, an apparatus includes a sealed housing defining an internal chamber and having a fluid inlet and a fluid outlet. The heater assembly is disposed within the internal chamber of the housing, and the heater assembly is adapted to provide a responsive heat distribution to a fluid within the housing.

In still another form of the present disclosure, a heater system comprises a heater assembly comprising a plurality of heater units, at least one heater unit having an independently controlled heating zone, and the heater assembly comprising a physical construction configured to deliver a variable power output per unit length along a length of the heater assembly. A plurality of power conductors are electrically connected to the heater units and a power supply device includes a controller configured to modulate power to the independently controlled heating zone through the power conductors based on at least one of heating conditions and heating requirements to provide a desired power output along a length of the heater assembly.

In variations of this heater system, which may be implemented individually or in any combination: a means for determining temperature is provided and a means for determining heating conditions or heating requirements is provided.

In another form of this heater system, an apparatus for heating fluid comprises a sealed housing defining an internal chamber and having a fluid inlet and a fluid outlet, and the heater assembly is disposed within the internal chamber of the housing. The heater assembly is adapted to provide a responsive heat distribution to a fluid within the housing.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
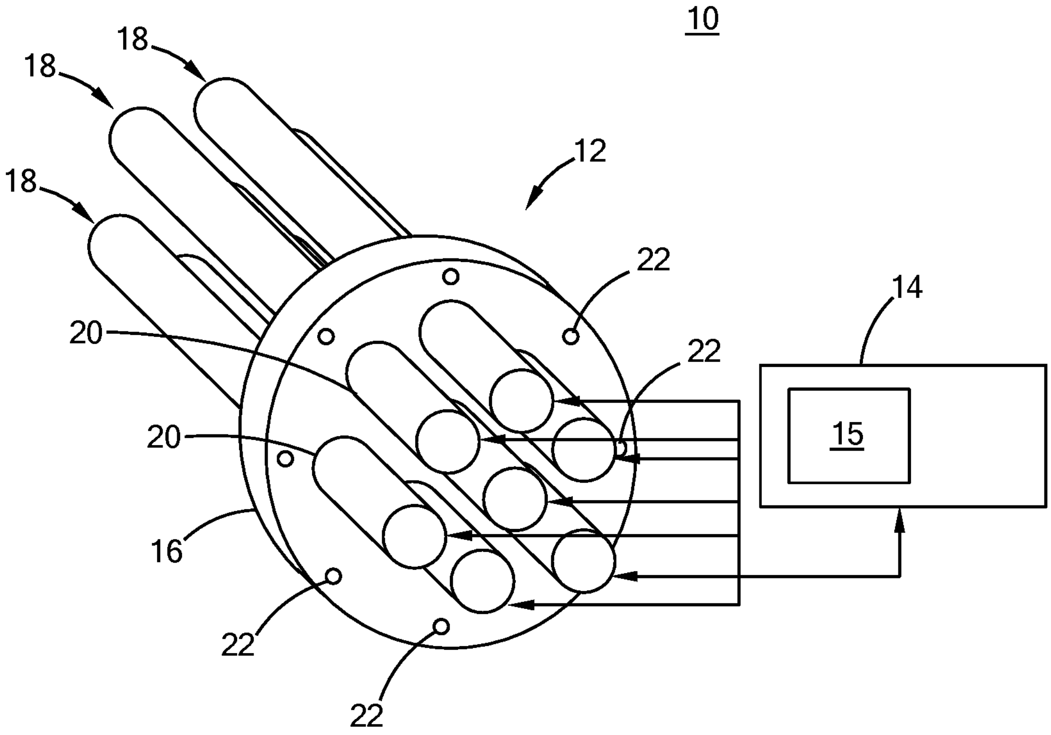
FIG. 1 is a perspective view of a heater bundle constructed in accordance with the teachings of the present disclosure.

Referring to FIG. 1, a heater system constructed in accordance with the teachings of the present disclosure is generally indicated by reference numeral 10. The heater system 10 includes a heater bundle 12 and a power supply device 14 electrically connected to the heater bundle 12. The power supply device 14 includes a controller 15 for controlling power supply to the heater bundle 12. A "heater bundle", as used in the present disclosure, refers to a heater apparatus including two or more physically distinct heating devices that can be independently controlled. Therefore, when one of the heating devices in the heater bundle fails or degrades, the remaining heating devices in the heater bundle 12 can continue to operate.

In one form, the heater bundle 12 includes a mounting flange 16 and a plurality of heater assemblies 18 secured to the mounting flange 16. The mounting flange 16 includes a plurality of apertures 20 through which the heater assemblies 18 extend. Although the heater assemblies 18 are arranged to be parallel in this form, it should be understood that alternate positions/arrangements of the heater assemblies 18 are within the scope of the present disclosure.

As further shown, the mounting flange 16 includes a plurality of mounting holes 22. By using screws or bolts (not shown) through the mounting holes 22, the mounting flange 16 may be assembled to a wall of a vessel or a pipe (not shown) that carries a fluid to be heated. At least a portion of the heater assemblies 18 are be immersed in the fluid inside the vessel or pipe to heat the fluid in this form of the present disclosure.

Figure 2:
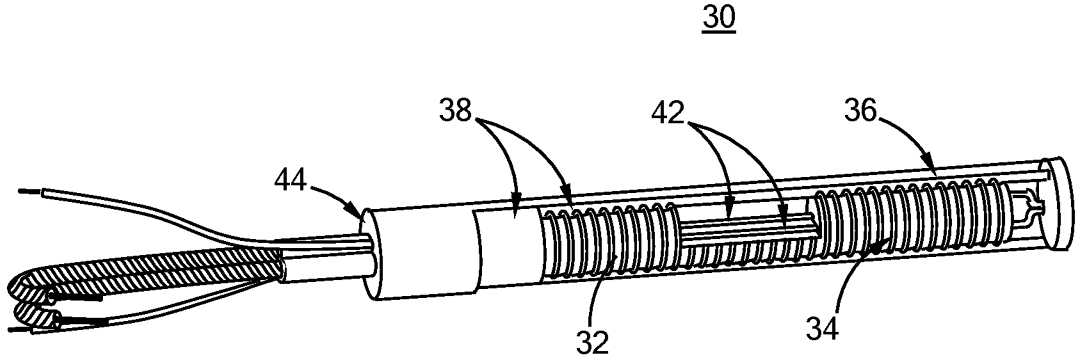
FIG. 2 is a perspective view of a heater assembly of the heater bundle of FIG. 1 in accordance with the teachings of the present disclosure.

Referring to FIG. 2, the heater assemblies 18 according to one form may be in the form of a cartridge heater 30. The cartridge heater 30 is a tube-shaped heater that generally includes a core body 32, a resistive heating wire 34 wrapped around the core body 32, a metal sheath 36 enclosing the core body 32 and the resistive heating wire 34 therein, and an insulating material 38 filling in the space in the metal sheath 36 to electrically insulate the resistive heating wire 34 from the metal sheath 36 and to thermally conduct the heat from the resistive heating wire 34 to the metal sheath 36. The core body 32 may be made of ceramic. The insulation material 38 may be compacted Magnesium Oxide (MgO). A plurality of power conductors 42 extend through the core body 32 along a longitudinal direction and are electrically connected to the resistive heating wires 34. The power conductors 42 also extend through an end piece 44 that seals the metal sheath 36. The power conductors 42 are connected to the power supply device 14 (shown in FIG. 1) to supply power from the power supply device 14 to the resistive heating wire 34. While FIG. 2 shows only two power conductors 42 extending through the end piece 44, more than two power conductors 42 can extend through the end piece 44. The power conductors 42 may be in the form of conductive pins. Various constructions and further structural and electrical details of cartridge heaters are set forth in greater detail in U.S. Pat. Nos. 2,831,951 and 3,970,822, which are commonly assigned with the present application and the contents of which are incorporated herein by reference in their entirety. Therefore, it should be understood that the form illustrated herein is merely exemplary and should not be construed as limiting the scope of the present disclosure.

Alternatively, multiple resistive heating wires 34 and multiple pairs of power conductors 42 may be used to form multiple heating circuits that can be independently controlled to enhance reliability of the cartridge heater 30. Therefore, when one of the resistive heating wires 34 fails, the remaining resistive heating wires 34 may continue to generate heat without causing the entire cartridge heater 30 to fail and without causing costly machine downtime.

Figure 3:
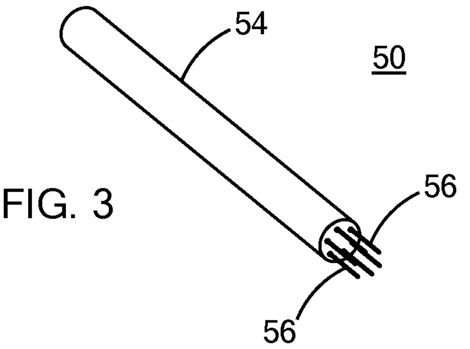
FIG. 3 is a perspective view of a variant of a heater assembly of the heater bundle of FIG. 1 in accordance with the teachings of the present disclosure.
Figure 4:
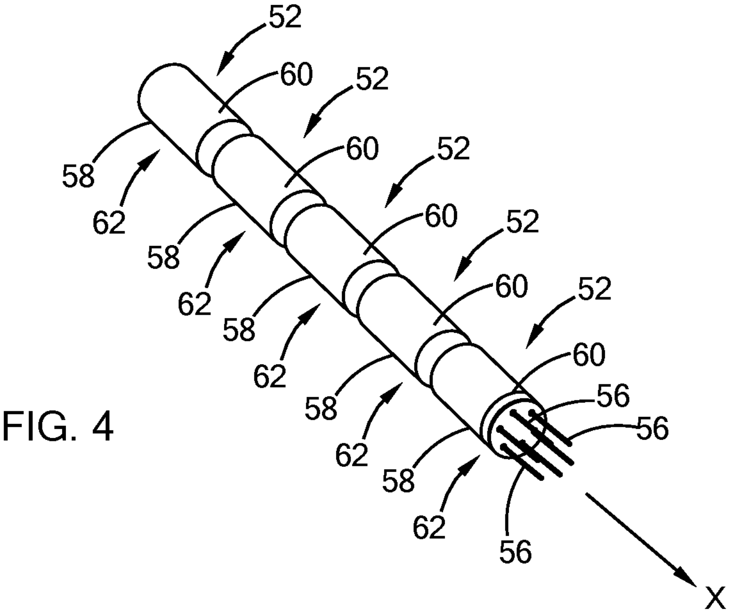
FIG. 4 is a perspective view of the heater assembly of FIG. 3 in accordance with the teachings of the present disclosure, wherein the outer sheath of the heater assembly is removed for clarity.
Figure 5:
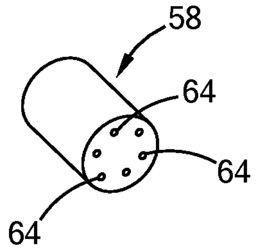
FIG. 5 is a perspective view of a core body of the heater assembly of FIG. 3 in accordance with the teachings of the present disclosure.

Referring to FIGS. 3 to 5, the heater assemblies 50 may be in the form of a cartridge heater having a configuration similar to that of FIG. 2 except for the number of core bodies and number of power conductors used. More specifically, the heater assemblies 50 each include a plurality of heater units 52, and an outer metal sheath 54 enclosing the plurality of heater units 52 therein, along with a plurality of power conductors 56. An insulating material (not shown in FIGS. 3 to 5) is provided between the plurality of heater units 52 and the outer metal sheath 54 to electrically insulate the heater units 52 from the outer metal sheath 54. The plurality of heater units 52 each include a core body 58 and a resistive heating element 60 surrounding the core body 58. The resistive heating element 60 of each heater unit 52 may define one or more heating circuits to define one or more heating zones 62.

In the present form, each heater unit 52 defines one heating zone 62 and the plurality of heater units 52 in each heater assembly 50 are aligned along a longitudinal direction X. Therefore, each heater assembly 50 defines a plurality of heating zones 62 aligned along the longitudinal direction X. The core body 58 of each heater unit 52 defines a plurality of through holes/apertures 64 to allow power conductors 56 to extend therethrough. The resistive heating elements 60 of the heater units 52 are connected to the power conductors 56, which, in turn, are connected to a power supply device 14. The power conductors 56 supply the power from the power supply device 14 to the plurality of heater units 52. By properly connecting the power conductors 56 to the resistive heating elements 60, the resistive heating elements 60 of the plurality of heater units 52 can be independently controlled by the controller 15 of the power supply device 14. As such, failure of one resistive heating element 60 for a particular heating zone 62 will not affect the proper functioning of the remaining resistive heating elements 60 for the remaining heating zones 62. Further, the heater units 52 and the heater assemblies 50 may be interchangeable for ease of repair or assembly.

In the present form, six power conductors 56 are used for each heater assembly 50 to supply power to five independent electrical heating circuits on the five heater units 52. Alternatively, six power conductors 56 may be connected to the resistive heating elements 60 in a way to define three fully independent circuits on the five heater units 52. It is possible to have any number of power conductors 56 to form any number of independently controlled heating circuits and independently controlled heating zones 62. For example, seven power conductors 56 may be used to provide six heating zones 62. Eight power conductors 56 may be used to provide seven heating zones 62.

The power conductors 56 may include a plurality of power supply and power return conductors, a plurality of power return conductors and a single power supply conductor, or a plurality of power supply conductors and a single power return conductor. If the number of heater zones is n, the number of power supply and return conductors is n+1.

Alternatively, a higher number of electrically distinct heating zones 62 may be created through multiplexing, polarity sensitive switching and other circuit topologies by the controller 15 of the power supply device 14. Use of multiplexing or various arrangements of thermal arrays to increase the number of heating zones within the cartridge heater 30 for a given number of power conductors (e.g. a cartridge heater with six power conductors for 15 or 30 zones.) is disclosed in U.S. Pat. Nos. 9,123,755, 9,123,756, 9,177,840, 9,196,513, and their related applications, which are commonly assigned with the present application and the contents of which are incorporated herein by reference in their entirety.

With this structure, each heater assembly 50 includes a plurality of heating zones 62 that can be independently controlled to vary the power output or heat distribution along the length of the heater assembly 50. The heater bundle 12 includes a plurality of such heater assemblies 50. Therefore, the heater bundle 12 provides a plurality of heating zones 62 and a tailored heat distribution for heating the fluid that flows through the heater bundle 12 to be adapted for specific applications. The power supply device 14 can be configured to modulate power to each of the independently controlled heating zones 62.

For example, a heater assembly 50 may define an "m" heating zones, and the heater bundle may include "k" heating assemblies 50. Therefore, the heater bundle 12 may define m×k heating zones. The plurality of heating zones 62 in the heater bundle 12 can be individually and dynamically controlled in response to heating conditions and/or heating requirements, including but not limited to, the life and the reliability of the individual heater units 52, the sizes and costs of the heater units 52, heater flux, characteristics and operation of the heater units 52, power output, power input, and total heat generated.

Each circuit, or selected heating zone, is individually controlled at a desired temperature or a desired power level so that the distribution of temperature and/or power adapts to variations in system parameters (e.g. manufacturing variation/tolerances, changing environmental conditions, changing inlet flow conditions such as inlet temperature, inlet temperature distribution, flow velocity, velocity distribution, fluid composition, fluid heat capacity, etc.). More specifically, the heater units 52 may not generate the same heat output when operated under the same power level due to manufacturing variations as well as varied degrees of heater degradation over time. The heater units 52 may be independently controlled to adjust the heat output according to a desired heat distribution. The individual manufacturing tolerances of components of the heater system and assembly tolerances of the heater system are increased as a function of the modulated power of the power supply, or in other words, because of the high fidelity of heater control, manufacturing tolerance of individual components need not be as tight/narrow.

The heater units 52 may each include a temperature sensor (not shown) for measuring the temperature of the heater units 52. When a hot spot in the heater units 52 is detected, the power supply device 14 may reduce or turn off the power to the particular heater unit 52 on which the hot spot is detected to avoid overheating or failure of the particular heater unit 52. The power supply device 14 may modulate the power to the heater units 52 adjacent to the disabled heater unit 52 to compensate for the reduced heat output from the particular heater unit 52.

The power supply device 14 may include multi-zone algorithms to turn off or turn down the power level delivered to any particular zone, and to increase the power to the heating zones adjacent to the particular heating zone that is disabled and has a reduced heat output. By carefully modulating the power to each heating zone, the overall reliability of the system can be improved. By detecting the hot spot and controlling the power supply accordingly, the heater system 10 has improved safety.

The heater bundle 12 with the multiple independently controlled heating zones 62 can accomplish improved heating. For example, some circuits on the heater units 52 may be operated at a nominal (or "typical") duty cycle of less than 100% (or at an average power level that is a fraction of the power that would be produced by the heater with line voltage applied). The lower duty cycles allow for the use of resistive heating wires with a larger diameter, thereby improving reliability.

Normally, smaller zones would employ a finer wire size to achieve a given resistance. Variable power control allows a larger wire size to be used, and a lower resistance value can be accommodated, while protecting the heater from overloading with a duty cycle limit tied to the power dissipation capacity of the heater.

The use of a scaling factor may be tied to the capacity of the heater units 52 or the heating zone 62. The multiple heating zones 62 allow for more accurate determination and control of the heater bundle 12. The use of a specific scaling factor for a particular heating circuit/zone will allow for a more aggressive (i.e. higher) temperature (or power level) at almost all zones, which, in turn, lead to a smaller, less costly design for the heater bundle 12. Such a scaling factor and method is disclosed in U.S. Pat. No. 7,257,464, which is commonly assigned with the present application and the contents of which are incorporated herein by reference in its entirety.

The sizes of the heating zones controlled by the individual circuits can be made equal or different to reduce the total number of zones needed to control the distribution of temperature or power to a desired accuracy.

Referring back to FIG. 1, the heater assemblies 18 are shown to be a single end heater, i.e., the conductive pin extends through only one longitudinal end of the heater assemblies 18. The heater assembly 18 may extend through the mounting flange 16 or a bulkhead (not shown) and sealed to the flange 16 or bulkhead. As such, the heater assemblies 18 can be individually removed and replaced without removing the mounting flange 16 from the vessel or tube.

Alternatively, the heater assembly 18 may be a "double ended" heater. In a double-ended heater, the metal sheath is bent into a hairpin shape and the power conductors pass through both longitudinal ends of the metal sheath so that both longitudinal ends of the metal sheath pass through and are sealed to the flange or bulkhead. In this structure, the flange or the bulkhead need to be removed from the housing or the vessel before the individual heater assembly 18 can be replaced.

Figure 6:
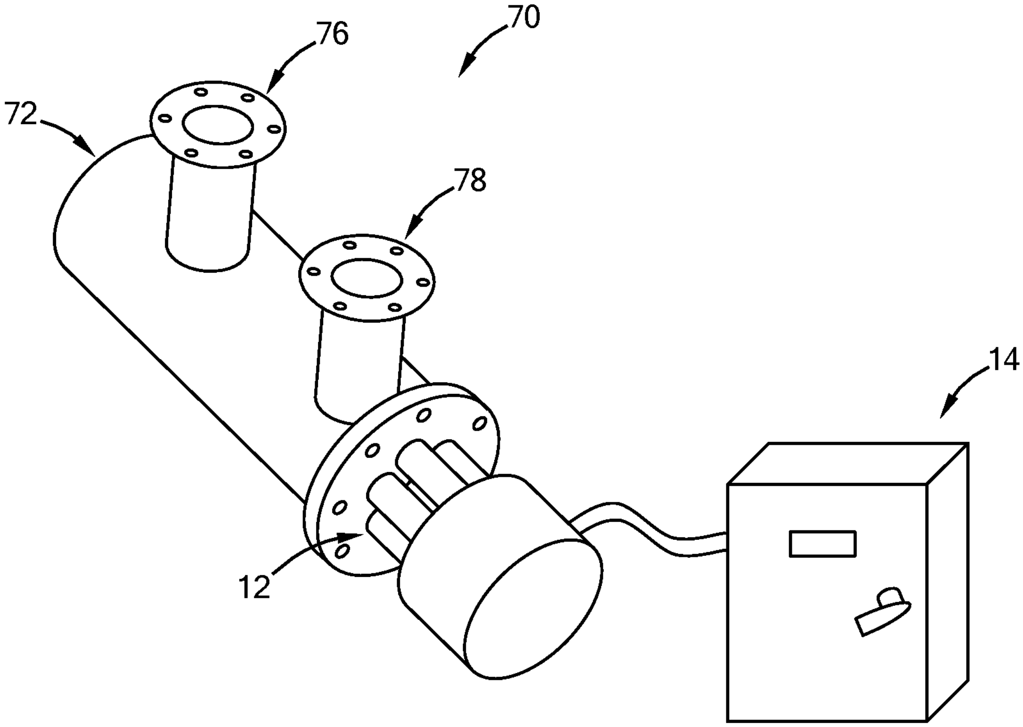
FIG. 6 is a perspective view of a heat exchanger including the heater bundle of FIG. 1 in accordance with the teachings of the present disclosure, wherein the heater bundle is partially disassembled from the heat exchanger to expose the heater bundle for illustration purposes.

Referring to FIG. 6, a heater bundle 12 is incorporated in a heat exchanger 70. The heat exchanger 70 includes a sealed housing 72 defining an internal chamber (not shown), a heater bundle 12 disposed within the internal chamber of the housing 72. The sealed housing 72 includes a fluid inlet 76 and a fluid outlet 78 through which fluid is directed into and out of the internal chamber of the sealed housing 72. The fluid is heated by the heater bundle 12 disposed in the sealed housing 72. The heater bundle 12 may be arranged for either cross-flow or for flow parallel to their length.

The heater bundle 12 is connected to a power supply device 14 which may include a means to modulate power, such as a switching means or a variable transformer, to modulate the power supplied to an individual zone. The power modulation may be performed as a function of time or based on detected temperature of each heating zone.

The resistive heating wire may also function as a sensor using the resistance of the resistive wire to measure the temperature of the resistive wire and using the same power conductors to send temperature measurement information to the power supply device 14. A means of sensing temperature for each zone would allow the control of temperature along the length of each heater assembly 18 in the heater bundle 12 (down to the resolution of the individual zone). Therefore, the additional temperature sensing circuits and sensing means can be dispensed with, thereby reducing the manufacturing costs. Direct measurement of the heater circuit temperature is a distinct advantage when trying to maximize heat flux in a given circuit while maintaining a desired reliability level for the system because it eliminates or minimizes many of the measurement errors associated with using a separate sensor. The heating element temperature is the characteristic that has the strongest influence on heater reliability. Using a resistive element to function as both a heater and a sensor is disclosed in U.S. Pat. No. 7,196,295, which is commonly assigned with the present application and the contents of which are incorporated herein by reference in its entirety.

Alternatively, the power conductors 56 may be made of dissimilar metals such that the power conductors 56 of dissimilar metals may create a thermocouple for measuring the temperature of the resistive heating elements. For example, at least one set of a power supply and a power return conductor may include different materials such that a junction is formed between the different materials and a resistive heating element of a heater unit and is used to determine temperature of one or more zones. Use of "integrated" and "highly thermally coupled" sensing, such as using different metals for the heater leads to generation of a thermocouple-like signal. The use of the integrated and coupled power conductors for temperature measurement is disclosed in U.S. Pat. No. 10,728,956, which is commonly assigned with the present application and the contents of which are incorporated herein by reference in its entirety.

The controller 15 for modulating the electrical power delivered to each zone may be a closed-loop automatic control system. The closed-loop automatic control system receives the temperature feedback from each zone and automatically and dynamically controls the delivery of power to each zone, thereby automatically and dynamically controlling the power distribution and temperature along the length of each heater assembly 18 in the heater bundle 12 without continuous or frequent human monitoring and adjustment.

The heater units 52 as disclosed herein may also be calibrated using a variety of methods including but not limited to energizing and sampling each heater unit 52 to calculate its resistance. The calculated resistance can then be compared to a calibrated resistance to determine a resistance ratio, or a value to then determine actual heater unit temperatures. Exemplary methods are disclosed in U.S. Pat. Nos. 5,280,422 and 5,552,998, which are commonly assigned with the present application and the contents of which are incorporated herein by reference in their entirety.

One form of calibration includes operating the heater system 10 in at least one mode of operation, controlling the heater system 10 to generate a desired temperature for at least one of the independently controlled heating zones 62, collecting and recording data for the at least one independently controlled heating zones 62 for the mode of operation, then accessing the recorded data to determine operating specifications for a heating system having a reduced number of independently controlled heating zones, and then using the heating system with the reduced number of independently controlled heating zones. The data may include, by way of example, power levels and/or temperature information, among other operational data from the heater system 10 having its data collected and recorded.

In a variation of the present disclosure, the heater system may include a single heater assembly 18, rather than a plurality of heater assemblies in a heater bundle 12. The single heater assembly 18 would comprise a plurality of heater units 52, each heater unit 52 defining at least one independently controlled heating zone. Similarly, power conductors 56 are electrically connected to each of the independently controlled heating zones 62 in each of the heater units 52, and the power supply device is configured to modulate power to each of the independently controlled heating zones 62 of the heater units through the power conductors 56.

Figure 7:
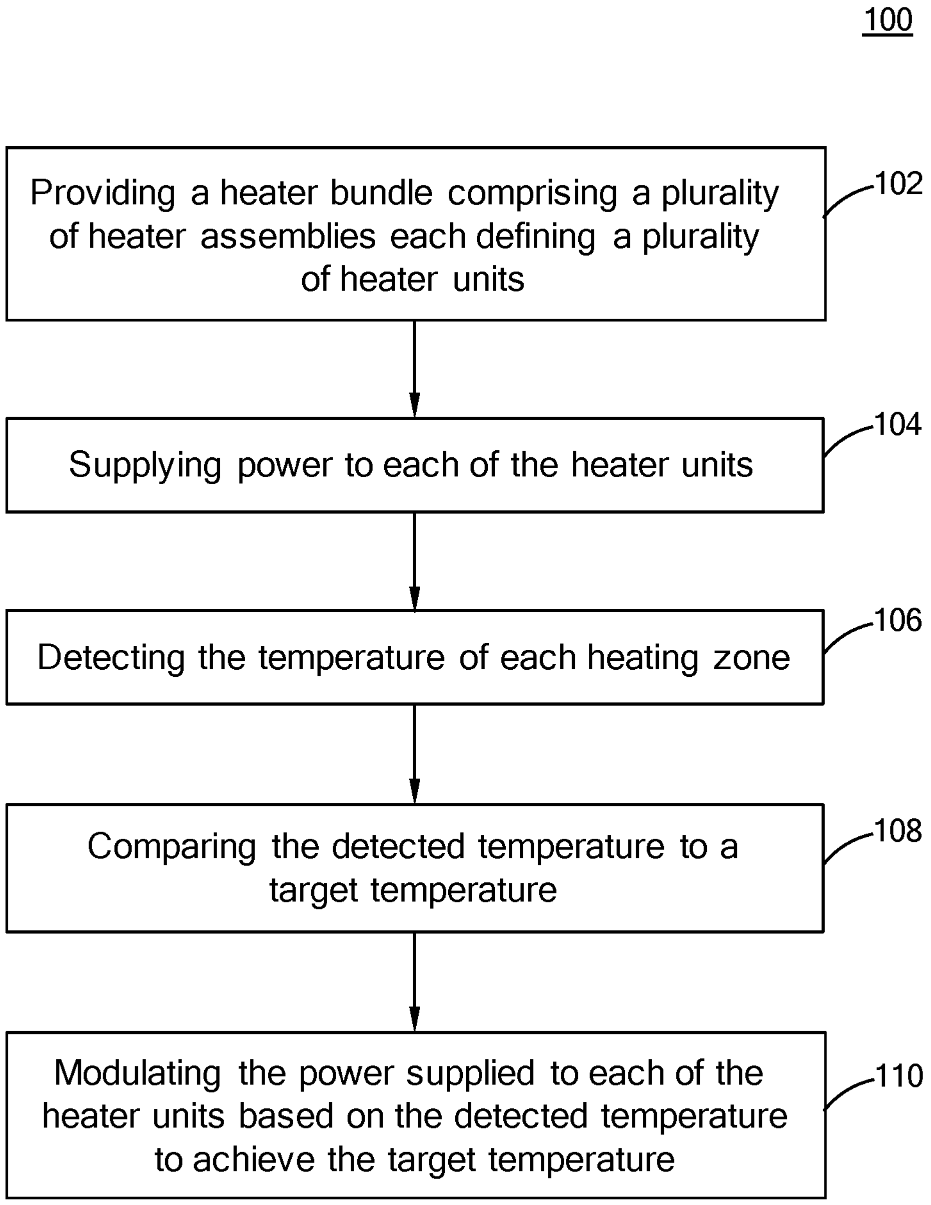
FIG. 7 is a block diagram of a method of operating a heater system including a heater bundle constructed in accordance with the teachings of the present disclosure.

Referring to FIG. 7, a method 100 of controlling a heater system includes providing a heater bundle comprising a plurality of heater assemblies in step 102. Each heater assembly includes a plurality of heater units. Each heater unit defines at least one independently controlled heating circuit (and consequently heating zone). The power to each of the heater units is supplied through power conductors electrically connected to each of the independently controlled heating zones in each of the heater units in step 104. The temperature within each of the zones is detected in step 106. The temperature may be determined using a change in resistance of a resistive heating element of at least one of the heater units. The zone temperature may be initially determined by measuring the zone resistance (or, by measurement of circuit voltage, if appropriate materials are used).

The temperature values may be digitized and communicated to a microprocessor. The measured (detected) temperature values may be compared to a target (desired) temperature for each zone in step 108. The power supplied to each of the heater units is then modulated based on the measured temperature to achieve the target temperatures in step 110.

Optionally, the method may further include using a scaling factor to adjust the modulating power. The scaling factor may be a function of a heating capacity of each heating zone. The controller 15 may include an algorithm, potentially including a scaling factor and/or a mathematical model of the dynamic behavior of the system (including knowledge of the update time of the system), to determine the amount of power to be provided (via duty cycle, phase angle firing, voltage modulation or similar techniques) to each zone until the next update. The desired power may be converted to a signal, which is sent to a switch or other power modulating device for controlling power output to the individual heating zones.

In the present form, when at least one heating zone is turned off due to an anomalous condition, the remaining zones continue to provide a desired wattage without failure. Power is modulated to a functional heating zone to provide a desired wattage when an anomalous condition is detected in at least one heating zone. When at least one heating zone is turned off based on the determined temperature, the remaining zones continue to provide a desired wattage. The power is modulated to each of the heating zones as a function of at least one of received signals, a model, and as a function of time.

For safety or process control reasons, typical heaters are generally operated to be below a maximum allowable temperature in order to prevent a particular location of the heater from exceeding a given temperature due to unwanted chemical or physical reactions at the particular location, such as combustion/fire/oxidation, coking boiling etc.). Therefore, this is normally accommodated by a conservative heater design (e.g., large heaters with low power density and much of their surface area loaded with a much lower heat flux than might otherwise be possible).

However, with the heater bundle of the present disclosure, it is possible to measure and limit the temperature of any location within the heater down to a resolution on the order of the size of the individual heating zones. A hot spot large enough to influence the temperature of an individual circuit can be detected.

Since the temperature of the individual heating zones can be automatically adjusted and consequently limited, the dynamic and automatic limitation of temperature in each zone will maintain this zone and all other zones to be operating at an optimum power/heat flux level without fear of exceeding the desired temperature limit in any zone. This brings an advantage in high-limit temperature measurement accuracy over the current practice of clamping a separate thermocouple to the sheath of one of the elements in a bundle. The reduced margin and the ability to modulate the power to individual zones can be selectively applied to the heating zones, selectively and individually, rather than applied to an entire heater assembly, thereby reducing the risk of exceeding a predetermined temperature limit.

The characteristics of the cartridge heater may vary with time. This time varying characteristic would otherwise require that the cartridge heater be designed for a single selected (worse-case) flow regime and therefore that the cartridge heater would operate at a sub-optimum state for other states of flow.

However, with dynamic control of the power distribution over the entire bundle down to a resolution of the core size due to the multiple heating units provided in the heater assembly, an optimized power distribution for various states of flow can be achieved, as opposed to only one power distribution corresponding to only one flow state in the typical cartridge heater. Therefore, the heater bundle of the present application allows for an increase in the total heat flux for all other states of flow.

Further, variable power control can increase heater design flexibility. The voltage can be de-coupled from resistance (to a great degree) in heater design and the heaters may be designed with the maximum wire diameter that can be fitted into the heater. It allows for increased capacity for power dissipation for a given heater size and level of reliability (or life of the heater) and allows for the size of the bundle to be decreased for a given overall power level. Power in this arrangement can be modulated by a variable duty cycle that is a part of the variable wattage controllers currently available or under development. The heater bundle can be protected by a programmable (or pre-programmed if desired) limit to the duty cycle for a given zone to prevent "overloading" the heater bundle.

Referring now to FIGS. 8A-8D, additional forms of the present disclosure are illustrated in which at least one heater assembly 50 as described above has a physical construction configured to deliver a variable power output per unit length along a length of the at least one heater assembly 50. This variable power output may be implemented in a variety of ways, and in a variety of combinations, several of which are illustrated and described herein as examples. The physical constructions described below may be provided in one or more heater units 52, and in one or more heater assemblies 50 in any combination. Further, the additional teachings herein for the variable power output may be combined with any of the previously described forms of the present disclosure, whether individually or in any combination, while remaining within the scope of the present disclosure.

Figure 8A:
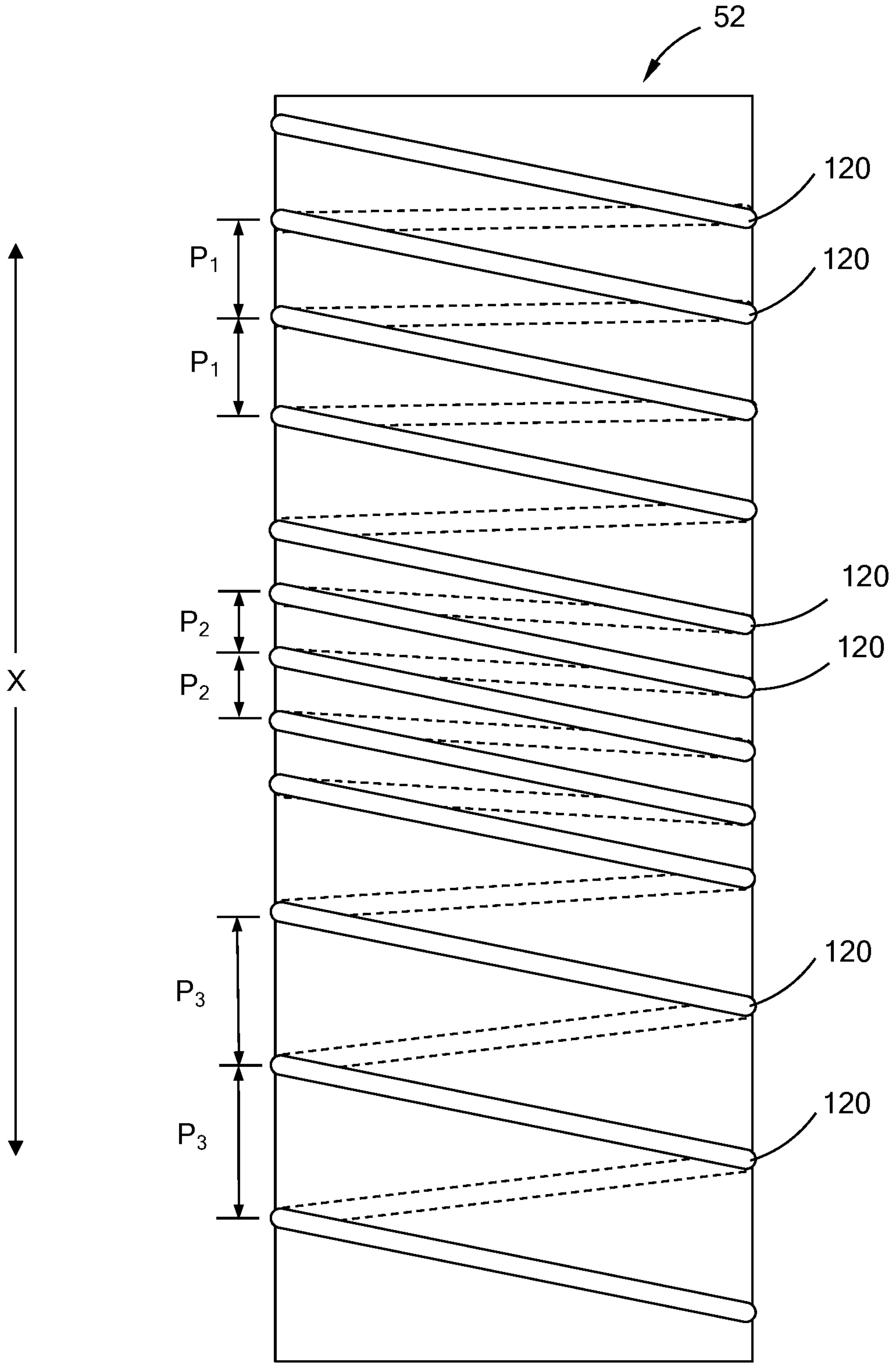
FIG. 8A is a side view of one form of a heater unit having a variable power output constructed in accordance with the teachings of the present disclosure.

In one form shown in FIG. 8A, the variable power output is provided by a physical construction of a resistive heating element 120 having a variable pitch. As used herein, the term "pitch" refers to a spacing between a center point of consecutive windings of the resistive heating element 120 along the longitudinal direction X, as indicated by $P_1$, $P_2$, and $P_3$ in this example. As shown in this example, the heater unit 52 has three distinct zones with different pitches, $P_1$, $P_2$, and $P_3$.

Figure 8B:
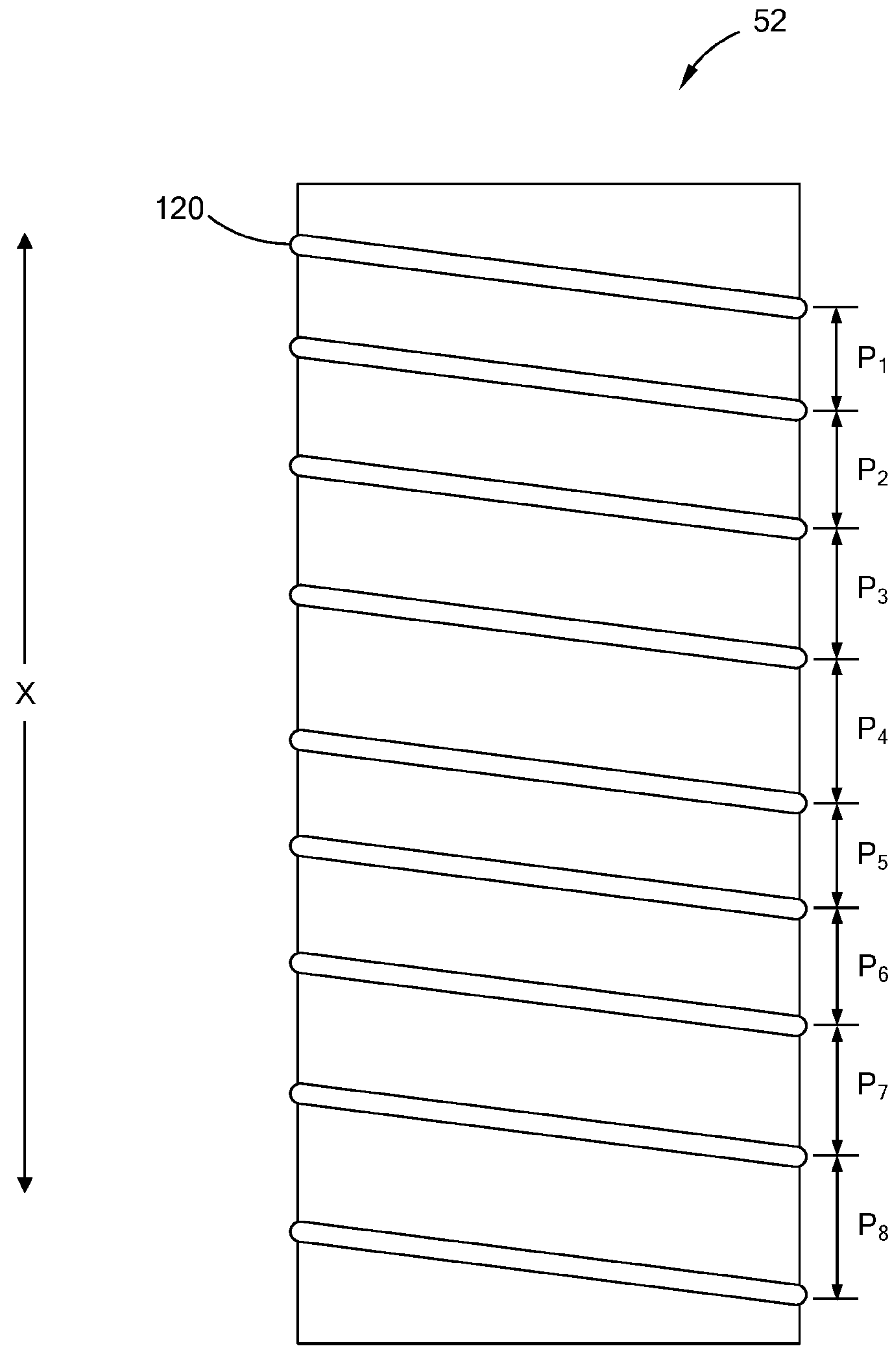
FIG. 8B is a side view of another form of a heater unit having a variable power output constructed in accordance with the teachings of the present disclosure.

In another form shown in FIG. 8B, the pitch is continuously variable along a length of the resistive heating element 120, or along the longitudinal direction X. More specifically, the pitch between each of the windings varies continuously along the length, or in other words, the pitch between adjacent windings is continuously different from one winding to the next. In this example, $P_1 \neq P_2 \neq P_3 \neq P_4 \neq P_5 \neq P_6 \neq P_7 \neq P_8$. However, a pitch such as $P_4$ may be equal to a pitch $P_7$, provided the pitches between adjacent windings is different for a continuously variable pitch from one winding to the next.

Figure 8C:
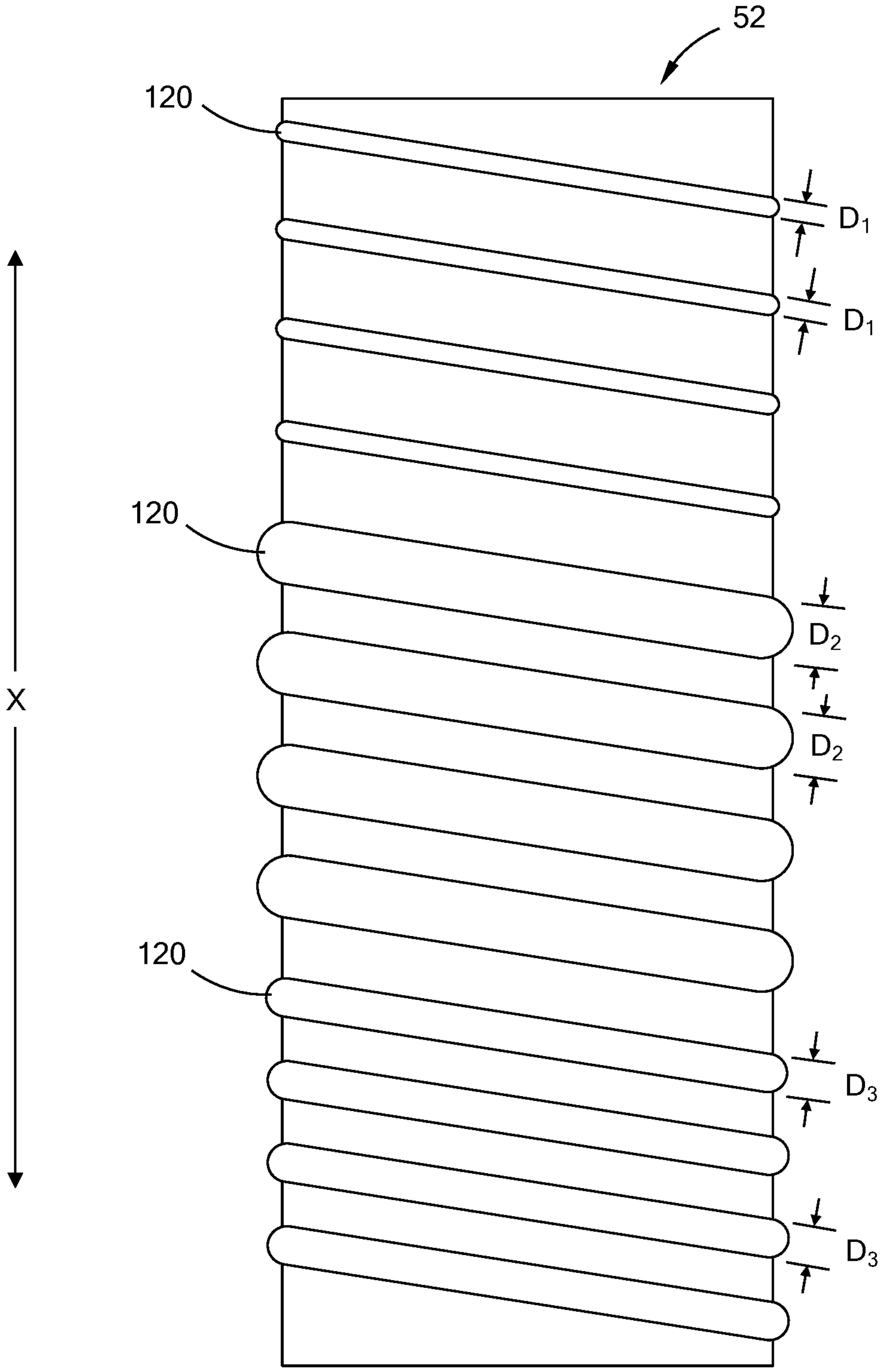
FIG. 8C is a side view of yet another form of a heater unit having a variable power output constructed in accordance with the teachings of the present disclosure.

In still another form shown in FIG. 8C, the variable power output is provided by a resistive heating element 120 having a variable cross-sectional area. This variable cross-sectional area may be provided with a resistive heating element 120 having different wire diameters $D_1$, $D_2$, and $D_3$ as shown, or the wire diameter itself may be continuously variable along its length (not shown). In another example not shown, if the resistive heating element 120 were formed by a layered process, its thickness and/or width could vary for a variable power output. This construction is illustrated in greater detail in U.S. Pat. No. 7,132,628 titled "Variable Watt Density Layered Heater System," which is commonly owned with the present application and the contents of which are incorporated herein by reference in their entirety. It should be understood that these and other variations of providing variable cross-sectional areas for the resistive heating element 120 should be construed as being within the scope of the present disclosure.

Figure 8D:
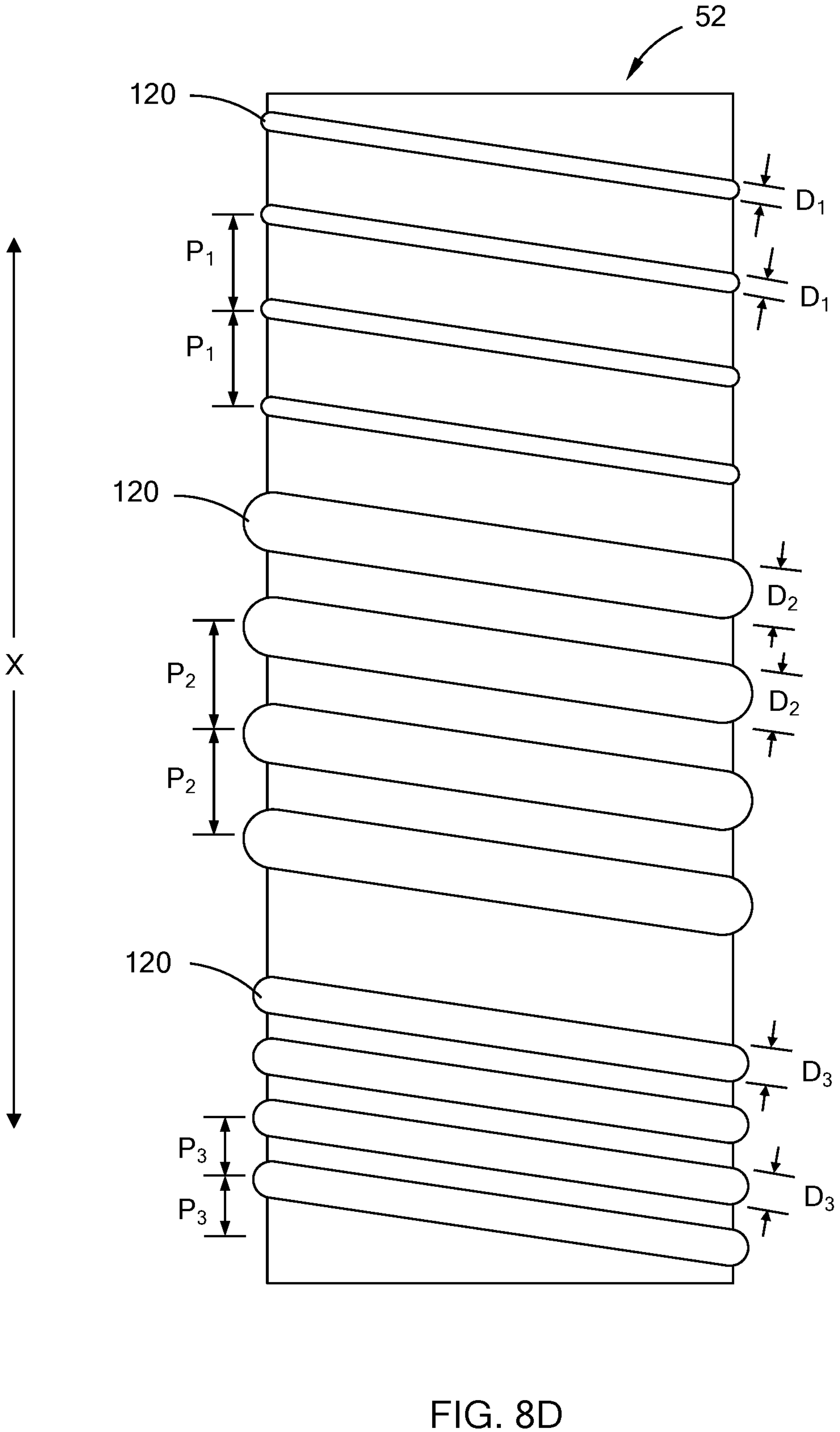
FIG. 8D is a side view of still another form of a heater unit having a variable power output constructed in accordance with the teachings of the present disclosure.

Referring to the additional example in FIG. 8D, the variable power output may be provided with the resistive heating element 120 having both a variable cross-sectional area and a variable pitch. In this example, three different cross-sectional areas are employed with diameters $D_1$, $D_2$, and $D_3$, and three different pitches are employed with pitches $P_1$, $P_2$, and $P_3$. These examples and other combinations of different cross-sectional areas and pitches to provide a variable power output within each heater unit 52 should be construed as being within the scope of the present disclosure.

Figure 8E:
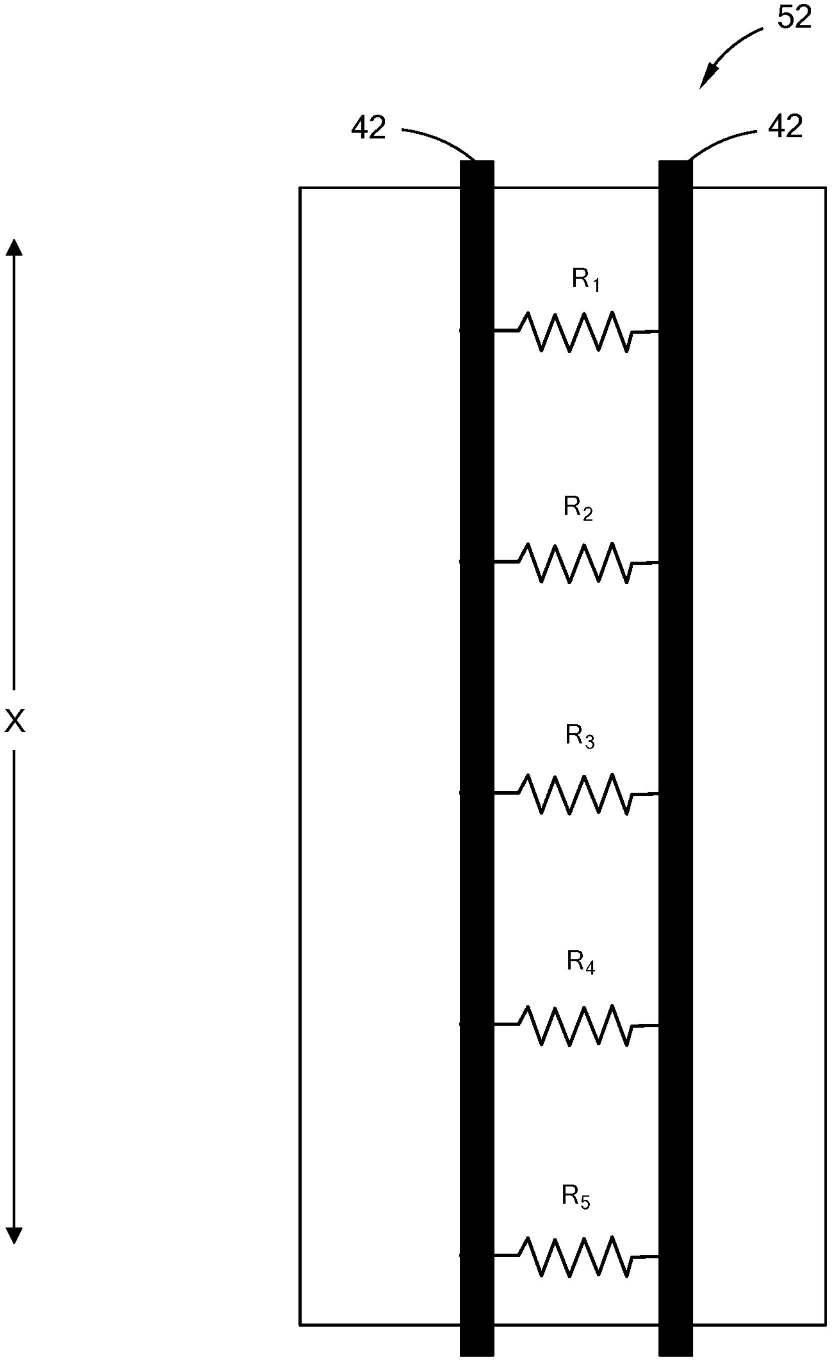
FIG. 8E is a schematic side view of another form of a heater unit having a plurality of parallel circuits to provide a variable power output in accordance with the teachings of the present disclosure.

Referring now to FIG. 8E, at least one of the heater units 52 in another form includes a plurality of parallel circuits with different values of resistance $R_1$, $R_2$, $R_3$, $R_4$, and $R_5$ for each resistive heating element 120 to provide the variable power output. In this form, each resistive heating element 120 is electrically connected in parallel across the power conductors 42. In another form, bus bars (not shown) may be employed to connect the resistive heating elements 120 in parallel, and the bus bars are then in electrical communication with the power conductors 42. It should be understood that any number of resistive heating elements 120 and different resistance values may be employed while remaining within the scope of the present disclosure other than those illustrated herein. For the different resistance values, this could be achieved in a variety of ways including, by way of example, different material compositions and different cross-sectional areas, among others.

In one form of the present disclosure, each heater unit 52 has a different power distribution than adjacent heater units in a given heater assembly 50. In another form, at least one heater unit 52 has an independently controlled heating zone with a variable power output in more than one heater assembly 50. It should be understood that these, among other variations illustrated herein for a variable power output, may be employed with the heater bundles and heater assemblies and illustrated and described herein while remaining within the scope of the present disclosure.

In still another form, the variable power output may be achieved by using a composite heating element. The composite heating element is made of a material that includes a material that has a variable electrical resistivity along its length, thus being configured to deliver a variable power output. As an example, the composite heating element of a heater unit has a higher electrical resistivity one end (near an adjacent heater unit or near an end portion of the heater assembly) and a lower electrical resistivity proximate its other end (near another opposed adjacent heater unit).

Figure 9:
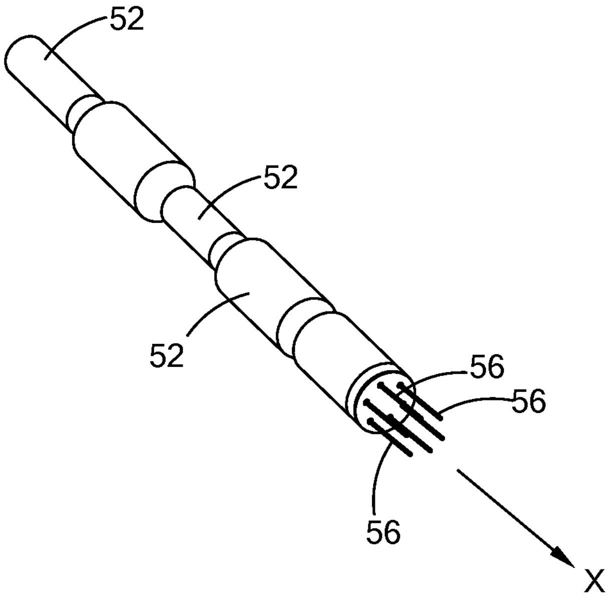
FIG. 9 is a perspective view of heater units having different cross-sectional areas and constructed in accordance with the teachings of the present disclosure.

Referring to FIG. 9, in another variation of the present disclosure, the physical construction comprises at least one heater unit 52 having a cross-sectional area that is different from adjacent heater units. It should be understood that more than one heater unit 52 may have a different cross-sectional area than others, and one or more heater assemblies 50 could have heater units 52 with different cross-sectional areas. Combined with the modulation of power to independently controlled heating zones as set forth above, these variable cross-sectional areas (in addition to the other physical constructions described herein) are another way of generating larger differences in power output along the length of the heater assemblies 50, while decoupling the physical constructions that provide variable power output from the power per unit area values of the independently controlled zones.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

Spatial and functional relationships between elements are described using various terms, including "connected," "engaged," "coupled," "adjacent," "next to," "on top of," "above," "below," and "disposed." Unless explicitly being described as being "direct," when a relationship between first and second elements is described in the present disclosure, that relationship can be a direct relationship where no other intervening elements are present between the first and second elements, and can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A heater system comprising:

a heater bundle comprising:

a plurality of heater assemblies, at least one of the heater assemblies comprising a plurality of heater units aligned along a longitudinal direction of the at least one of the heater assemblies, the at least one of the heater assemblies defining plurality of independently controlled heating zones, the at least one of the heater assemblies comprising a physical construction disposed at one of the plurality of heater units such that the one of the plurality of heater units has a structure different from that of an adjacent one of the plurality of heater units due to presence of the physical construction and such that the physical construction causes the one of the plurality of heater units to deliver a power output different from that of the adjacent one of the plurality of heater units;

a plurality of power conductors electrically connected to the plurality of heater units;

means for determining temperature; and a power supply device including a controller configured to modulate power to the plurality of independently controlled heating zones through the power conductors based on the determined temperature to provide a desired power output along a length of the at least one of the heater assemblies.

2. The heater system according to claim 1, wherein the physical construction comprises a resistive heating element within the one of the plurality of heater units having a variable pitch.

3. The heater system according to claim 2, wherein the variable pitch is continuously variable along a length of the resistive heating element.

4. The heater system according to claim 1, wherein the physical construction comprises a resistive heating element within the one of the plurality of heater units having a variable cross-sectional area, wherein the variable cross-sectional area comprises portions with different wire diameters or a wire diameter that is continuously variable along a length of the resistive heating element.

5. The heater system according to claim 1, wherein the physical construction comprises a resistive heating element within the one of the plurality of heater units having a variable cross-sectional area and a variable pitch, wherein the variable cross-sectional area comprises portions with different wire diameters or a wire diameter that is continuously variable along a length of the resistive heating element.

6. The heater system according to claim 1, wherein the physical construction comprises a plurality of parallel circuits with different values of resistance within the one of the plurality of heater units.

7. The heater system according to claim 1, wherein the physical construction is provided in more than one of the plurality of heater units.

8. The heater system according to claim 1 wherein the physical construction comprises a composite heating element including a material with a variable electrical resistivity along a length of the composite heating element, the composite heating element having a higher electrical resistivity proximate an adjacent heater unit or an end portion of the at least one heater assembly and a lower electrical resistivity proximate another opposed adjacent heater unit.

9. The heater system according to claim 1, wherein the physical construction is provided in more than one of the heater assemblies.

10. The heater system according to claim 1, wherein at least one heater assembly from among the plurality of the heater assemblies is a cartridge heater comprising a core body, a resistive heating wire wrapped around the core body, a metal sheath enclosing the core body and the resistive heating wire therein, and an insulating material filling in a space in the metal sheath to electrically insulate the resistive heating wire from the metal sheath and to thermally conduct heat from the resistive heating wire to the metal sheath.

11. The heater system according to claim 1, wherein the physical construction comprises the one of the plurality of heater units having a cross-sectional area that is different from the cross-sectional area of adjacent heater units.

12. The heater system according to claim 1, wherein the heater units include a plurality of resistive heating elements, wherein at least one of the resistive heating elements functions as a sensor.

13. The heater system according to claim 1, wherein the physical construction comprises a composite heating element including a material having a variable electrical resistivity.

14. The heater system according to claim 13, wherein the variable electrical resistivity comprises a higher electrical resistivity proximate an adjacent heater unit or an end portion of the at least one heater assembly and a lower electrical resistivity proximate an opposed adjacent heater unit.

15. An apparatus for heating fluid comprising:

a sealed housing defining an internal chamber and having a fluid inlet and a fluid outlet; and the heater system according to claim 1, the heater bundle being disposed within the internal chamber of the housing, wherein the heater bundle is adapted to provide a responsive heat distribution to a fluid within the housing.

16. A heater system comprising:

a heater bundle comprising:

a plurality of heater assemblies, at least one of the heater assemblies comprising a plurality of heater units aligned along a longitudinal direction of the at least one of the heater assemblies, the at least one of the heater assemblies defining a plurality of independently controlled heating zones, and the at least one of the heater assemblies comprising a physical construction disposed at one of the plurality of heater units such that the one of the plurality of heater units has a structure different from that of an adjacent one of the plurality of heater units due to presence of the physical construction and such that the physical construction causes the one of the plurality of heater units to deliver a power output different from that of the adjacent one of the plurality of heater units; and a plurality of power conductors electrically connected to the heater units;

means for determining at least one of heating conditions and heating requirements; and a power supply device including a controller configured to modulate power to the independently controlled heating zone through the power conductors based on the at least one of heating conditions and heating requirements to provide a desired power output along a length of the at least one heater assembly.

17. The heater assembly according to claim 16, wherein the at least one of heating conditions and heating requirements are selected from the group consisting of life of the heater units, reliability of the heater units, sizes of the heater units, costs of the heater units, heater flux, characteristics and operation of the heater units, power output, power input, and total heat generated.

18. An apparatus for heating fluid comprising:

a sealed housing defining an internal chamber and having a fluid inlet and a fluid outlet; and the heater system according to claim 16, the heater assembly being disposed within the internal chamber of the housing, wherein the heater assembly is adapted to provide a responsive heat distribution to a fluid within the housing.

19. A heater system comprising:

a heater assembly comprising a plurality of heater units aligned along a longitudinal direction of the heater assembly, the heater assembly defining a plurality of independently controlled heating zones, and the heater assembly comprising a physical construction disposed at one of the plurality of heater units such that the one of the plurality of heater units has a structure different from that of an adjacent one of the plurality of heater units due to presence of the physical construction and such that the physical construction causes the one of the plurality of heater units to deliver a power output different from that of the adjacent one of the plurality of heater units;

a plurality of power conductors electrically connected to the heater units; and a power supply device including a controller configured to modulate power to the independently controlled heating zone through the power conductors based on at least one of heating conditions and heating requirements to provide a desired power output along a length of the heater assembly.

20. The heater system according to claim 19 further comprising a means for determining temperature.

21. The heater system according to claim 19 further comprising a means for determining heating conditions or heating requirements.

22. An apparatus for heating fluid comprising:

a sealed housing defining an internal chamber and having a fluid inlet and a fluid outlet; and the heater system according to claim 19, the heater assembly being disposed within the internal chamber of the housing, wherein the heater assembly is adapted to provide a responsive heat distribution to a fluid within the housing.

* * * * *